United States Patent
Ellzey

[11] Patent Number: 6,053,192
[45] Date of Patent: Apr. 25, 2000

[54] LOW OPERATING FORCE PRESSURE REGULATOR

[76] Inventor: Steven J. Ellzey, 2117 Briarwood Dr., Grand Prairie, Tex. 75050

[21] Appl. No.: 09/183,673

[22] Filed: Oct. 30, 1998

[51] Int. Cl.[7] .................................................. G05D 16/10
[52] U.S. Cl. ...................... 137/12; 137/505; 137/505.18; 137/508
[58] Field of Search ................................ 137/12, 14, 505, 137/505.25, 508, 505.18

[56] References Cited

U.S. PATENT DOCUMENTS

| | | | |
|---|---|---|---|
| 614,441 | 11/1898 | Burnett | 137/505.25 |
| 1,022,330 | 4/1912 | Ramsey . | |
| 2,731,034 | 1/1956 | Dinkelkamp | 137/495 |
| 2,777,458 | 1/1957 | Stern | 137/116.5 |
| 2,920,647 | 1/1960 | Mercier | 137/505.18 |
| 3,630,228 | 12/1971 | Turner et al. | 137/614.18 |
| 3,791,412 | 2/1974 | Mays | 137/614.11 |
| 3,848,631 | 11/1974 | Fallon | 137/505.25 |

FOREIGN PATENT DOCUMENTS

| | | | |
|---|---|---|---|
| 479522 | 6/1975 | Australia | 137/508 |

*Primary Examiner*—Stephen M. Hepperle
*Attorney, Agent, or Firm*—Gregory M. Howison; Mark W. Handley

[57] ABSTRACT

A set point of a pressure output of a pressure regulator (12) is adjustable without having to overcome a biasing force to selectively adjust the set point of the pressure output. The regulator includes a housing (14) having a chamber (18) and a pressure output port (24) in fluid communication with the chamber (18). A piston (38) having an interior cavity (42) is slidably disposed within the chamber (18) of the housing (14). A biasing member (88) extends between the piston (38) and the housing (14), such that a biasing force is applied to the piston (38) which increases as the piston (38) is moved in a direction away from the pressure output port (24) of the housing (14). The piston (38) has a first flow port (54) which extends through a wall of the piston (38). An operating member (56) has a second flow port (60) which is positionable within the interior cavity (42) of the piston (38) at selected distances from the ends (20, 22) of the housing (14). The second flow port (60) is in fluid communication with a supply pressure. A seal (72) extends into the interior cavity (42), between the operating member (56) and the piston (38). The output pressure pushes against the piston (38) to compress the biasing member (88) to align the first flow port (54) relative to respective ones of the seal (72) and the second flow port (60), according to the value of the pressure output relative to the set point. The selected position of the operating member (56) within the housing (14) determines a positioning of the piston (38) for aligning the first flow port (54) relative to the seal (72) and the second flow port (60).

20 Claims, 2 Drawing Sheets

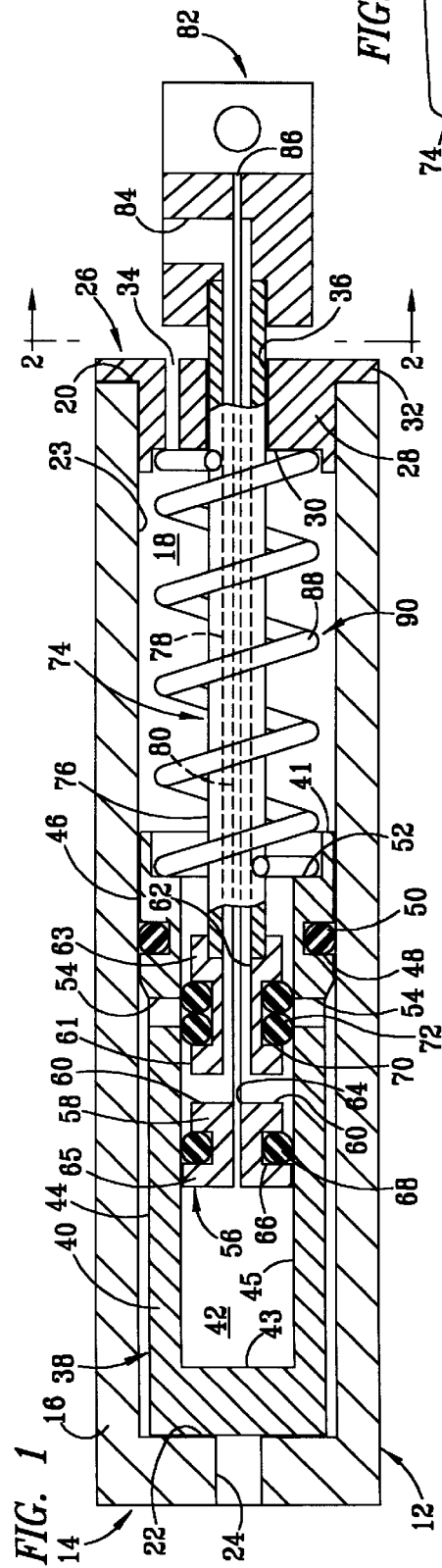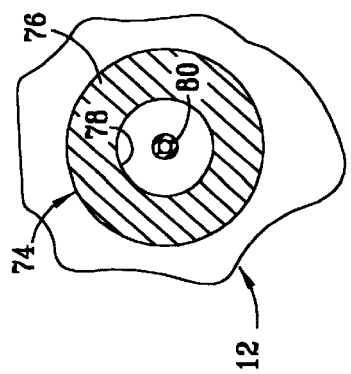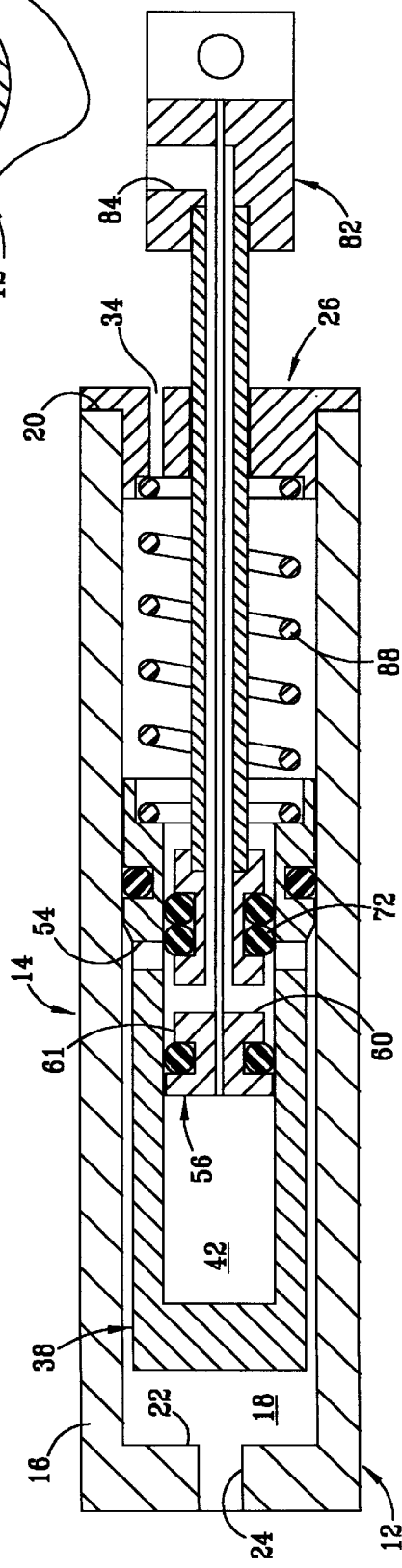

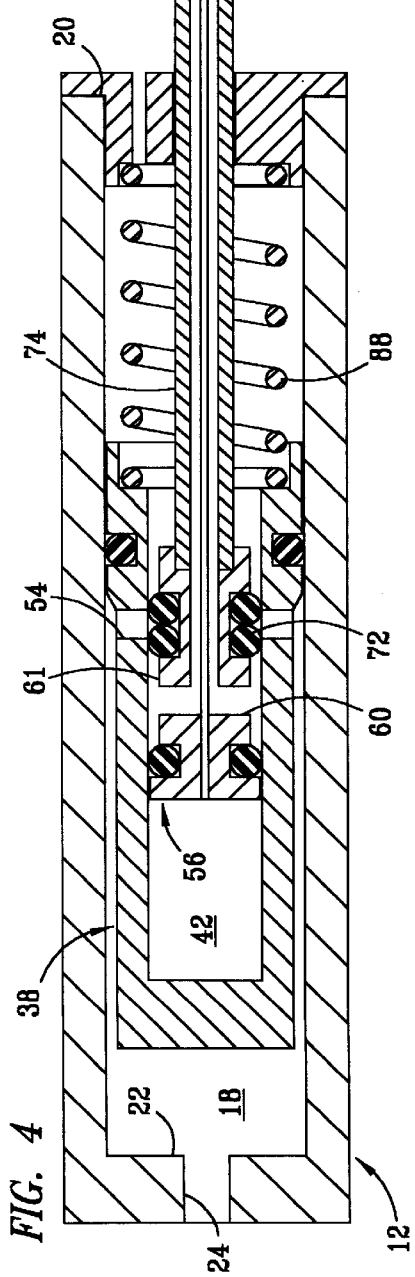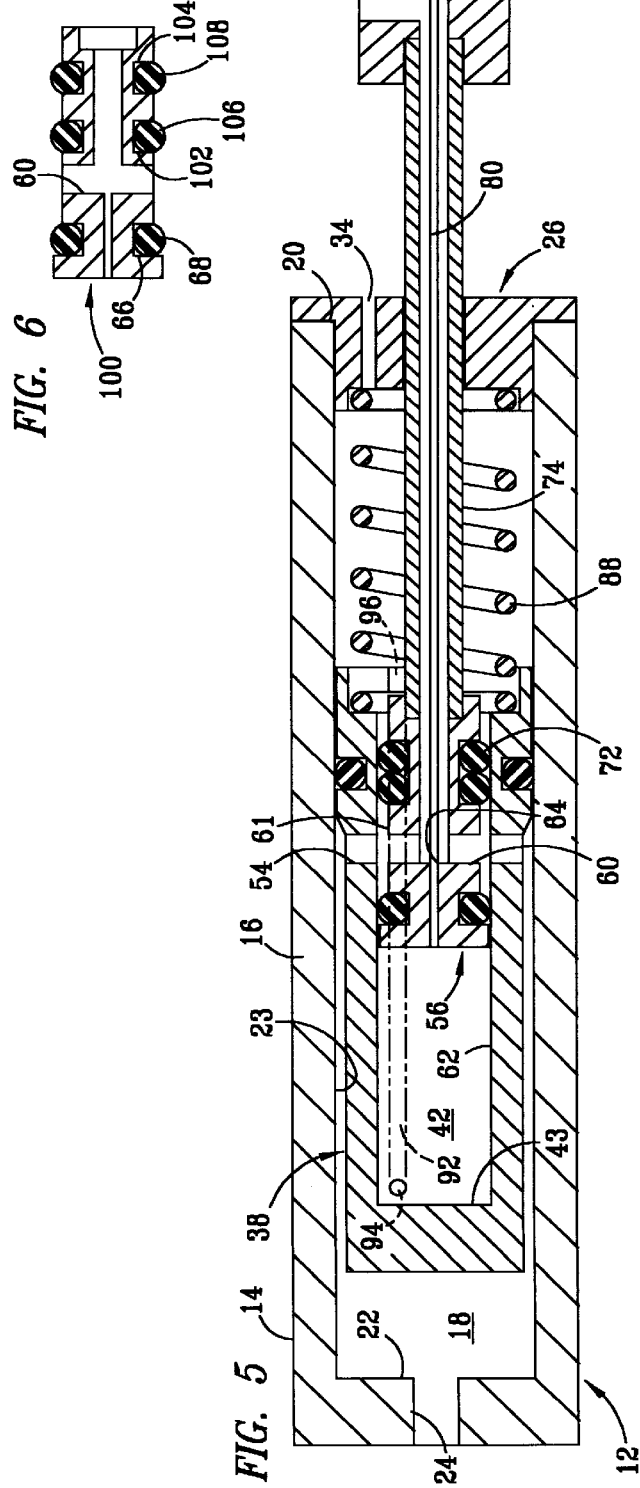

ating Force Pressure Regulator

BACKGROUND OF THE INVENTION

Prior art pressure regulators have provided stable pressure outputs of operating fluids used in pneumatic and hydraulic fluid systems. Prior art pressure regulators typically include an input port and an output pressure region. A valve member is exposed to the output pressure and is connected to a biasing member. The pressure within the output pressure region acts on the valve member to counteract the force of the biasing means and move the valve member in response to changes in the pressure of the output pressure region. When the force of the output pressure acting on the valve member exceeds the force of the biasing means which acts upon the valve member, the valve member will be pressed against a valve seat to seal against fluid flow through the pressure regulator. When the force of the output pressure acting upon the valve member is less than that of the force of the biasing means, the valve member will move away from the valve seat and fluids may then again flow through the pressure regulator.

Typically, the biasing means is provided by a spring. The set point of a pressure regulator is selected by compressing the spring with a control means such that the space between one end of the pressure regulator and the control means is reduced in order to increase the compression of the biasing member, which presses the spring against the valve member with a force that determines the output pressure. If an increase in the output pressure is desired, typically the biasing means is further compressed to cause the biasing means to push against the valve member with a greater force. As increases in pressures are desired, more force must be exerted to compress the biasing means in order to cause the biasing means to press harder against one end of the valve member. A desired pressure output of the pressure regulator is selected by selecting a distance between the valve seat and the control means.

SUMMARY OF THE INVENTION

A set point of a pressure output of a pressure regulator is adjustable without having to overcome a biasing force to selectively adjust the set point of the pressure output. The pressure regulator includes a housing having a chamber and a pressure output port in fluid communication with the chamber. A piston having an interior cavity is slidably disposed within the chamber of the housing. A biasing member extends between the piston and the housing, such that a biasing force is applied to the piston which increases as the piston is moved in a direction away from the pressure output port of the housing. The piston has a first flow port which extends through a wall of the piston. An operating member has a second flow port which is positionable within the interior cavity of the piston at selected distances from the ends of the housing. The second flow port is in fluid communication with a supply pressure. A seal extends into the interior cavity, between the operating member and the piston. The output pressure pushes against the piston to compress the biasing member to align the first flow port relative to respective ones of the seal and the second flow port, according to the value of the pressure output relative to the set point. The selected position of the operating member within the housing determines a positioning of the piston for aligning the first flow port relative to the seal and the second flow port.

BRIEF DESCRIPTION OF THE DRAWINGS

For a more complete understanding of the present invention and the advantages thereof, reference is now made to the following description taken in conjunction with the accompanying Drawings in which:

FIG. 1 is a longitudinal section view of a low operating force pressure regulator made according to the present invention;

FIG. 2 is a cross-sectional view of the pressure regulator, taken along section line 2—2 of FIG. 1;

FIG. 3 is a longitudinal section view of the pressure regulator, shown after an operating member has been moved to a first distance from the output end of the pressure regulator to determine a first pressure set point;

FIG. 4 is a longitudinal section view of the pressure regulator, shown at the first pressure set point after a hollow piston has been moved to place a seal between a flow port through the piston and a flow port through the operating member to seal against fluid passing through the pressure regulator;

FIG. 5 is a longitudinal section view of the pressure regulator, shown after the operating member thereof has been moved to a second distance from the output end of the pressure regulator, to define a third pressure set point; and FIG. 6 is a longitudinal section view of an alternative valve operating member for use in the pressure regulator.

DETAILED DESCRIPTION OF THE INVENTION

FIG. 1 is a longitudinal section view of a pressure regulator 12, shown in the off position, in which an operating fluid will not pass through the regulator 12. The pressure regulator 12 includes a housing 14 having a cylindrical body 16. A chamber 18 is disposed within the cylindrical body 16. The chamber 18 has an open end 20, a closed end 22 and a polished bore 23 to provide a seal surface which conventional elastomeric seals may be pressed against to seal against fluid flow. A pressure output port 24 extends through the closed end 22 of the housing 14, adjacent to an output portion of the chamber 18. The output portion of the chamber 18 is that which is in fluid communication with the pressure output port 24, and the output portion of the chamber 18 is also preferably adjacent to the port 24. An end cap 26 is rigidly secured to the open end 20 of the chamber 18. The end cap 26 has a plug portion 28 for engaging within the chamber 18. A spring seat 30 is provided by a circular-shaped recess formed into the inward end of the plug portion 28 which faces inward toward the chamber 18. A flange 32 fits flush against the terminal portion of the open end 20 of the cylindrical body 16, and fits flush with the exterior surface of the cylindrical body 16. A vent hole 34 extends through the end cap 26, from the chamber 18 to the exterior of the housing 14 of the pressure regulator 12, for venting to the exterior of the housing 14 the portion of the chamber 18 which is adjacent to the plug portion 28. A guide hole 36 also extends through the end cap 26, concentrically aligned with a longitudinal axis of the cylindrical body 16 of the housing 14.

A hollow piston 38 is disposed concentrically within the chamber 18 of the housing 14. The piston 38 has a cylindrical body 40 within which is defined an interior cavity 42. The interior cavity 42 has an open end 41, a closed end 43 and a polished bore 45 to provide a sealing surface for conventional elastomeric seals to press against to prevent fluid flow. The piston 38 has an exterior which defines a reduced diameter portion 44 and an enlarged diameter portion 46. The reduced diameter portion 44 of the piston 38 extends on a portion of the piston 38 which is adjacent to the pressure output port 24 of the chamber 18 to provide a flow path for passage of operating fluids between the reduced diameter portion 44 and the interior surface 23 of the chamber 18 and to the pressure output port 24. The enlarged diameter portion 46 has a gland 48 defined therein for receiving a seal element 50. Preferably, elastomeric seals, such as conventional o-rings, are utilized to provide the seal 50. However, other types of seals may be utilized to provide the seal 50 in addition to the resilient elastomeric seals described herein. In other embodiments, the seal 50 and other fluid seals listed below may be provided by flow restrictions which only allow a limited flow therethrough. The seal 50 extends between the interior surface 23 of the chamber 18 and the gland 48 to prevent flow of the operating fluid therebetween. A spring seat 52 is defined by a circular-shaped recess formed into the open end 41 of the piston 38. Flow ports 54 extend from within the interior cavity 42 of the piston 38 to the reduced diameter portion 44 of the exterior of the piston 38. The flow ports 54 extend in a radial direction relative to the longitudinal axes of the piston 38 and the cylindrical body 16. Operating fluids may pass from the interior cavity 42 of the piston 38, through the flow ports 54, through the annular space defined between the reduced diameter portion 44 of the piston 38 and the interior surface 23 of the chamber 18, and to the pressure output port 24.

An operating member 56 defines a positionable valve member which is selectively positioned within the interior cavity 42 of the piston 38 to determine the output pressure set point of regulator 12. The operating member 56 includes a cylindrical body 58 and flow ports 60. The exterior of the operating member 56 defines an annular region 61 which is disposed adjacent to the flow port 60, and which is spaced apart from the surface of the interior cavity 42 of the piston 38 to provide an operating fluid flow path between the flow ports 60 of the operating member 56 and the flow ports 54 of the piston 38. The flow ports 60 extend in a radial direction relative to the central axis of the operating member 56, and the longitudinal axes of the piston 38 and the cylindrical chamber 18. A flow passage 62 extends longitudinally within the operating member 56, from the flow ports 60 to a supply end of the operating member 56. The flow passage 62 does not extend completely through the operating member 56, and is provided by a blind hole formed into the supply end 63 of the operating member 56. The flow ports 60 are drilled into the sides of the operating member 56 and connect to the bottom of the blind hole which provides the flow passage 62. A vent passage 64 extends longitudinally through the operating member 56, from the supply end 63 of the operating member 56 to a discharge end 65 of the operating member 56, which faces the closed end 43 of the interior cavity 42 of the piston 38.

A gland 66 is defined to circumferentially extend around an exterior of the cylindrical body 58 of the operating member 56, between the flow ports 60 and the discharge end 65 of the operating member 56. A seal 68 is disposed within the gland 66 to sealingly engage between the operating member 56 and the surface 45 of the interior cavity 42 of the piston 38 with a sliding, or dynamic, sealing engagement therebetween. A second gland 70 is disposed to circumferentially extend around the cylindrical body 58 of the operating member 56 in a region of the cylindrical body 58 which is between the flow ports 60 and the end 63 of the operating member 56 which is closest to the open end 41 of the interior cavity 42 of piston 38. The seal 72, which is preferably provided by two elastomeric o-rings, is disposed within the gland 70 to sealingly engage between the cylindrical body 58 of the operating member 56 and the surface 45 of the interior cavity 42 of the cylindrical body 40 of the piston 38 with a sliding, or dynamic, sealing engagement. The fluid pressure disposed at the flow ports 60 will be retained between the seal 68 and the seal 72.

A stem 74 has a rod-like body 76 which extends through the guide hole 36. The guide hole 36 provides a bearing surface for engaging the body 76 in a sliding engagement. The stem 74 is coupled to the supply end 63 of the cylindrical body 58 of the operating member 56. A flow passage 78 and a vent passage 80 extend longitudinally through rod-like body 76 of the stem 74 to register with the flow passage 62 and the vent passage 64, respectively, of the operating member 56. The flow passage 78 and the flow passage 62 are sealed such that the flow passages 78 and 62 will not vent supply air to the vent passages 64 and 80. A head 82 is mounted to the outward end of the stem 74. The head 82 has a supply connector 84 which is directly connected to the flow passage 78. The head 82 further includes a vent port 86 which is directly connected to the vent passage 80.

A biasing means is provided by a coiled compression spring 88. The biasing spring 88 is held in place within the housing 14 by the spring seat 30 of the end cap 26 and the spring seat 52 of the piston 38. A biasing section 90 is defined by the portion of the chamber 18 which is disposed adjacent to the open end 20 of the cylindrical body 16, within which the spring 88 and the spring seats 30 and 52 are disposed. The end cap 26 is disposed at a fixed distance from the closed end 22 of the housing 14. The set point of the output pressure of the pressure regulator 12 is selected by the positioning of the operating member 56 at selected distances between the open end 20 and the closed end 22 of the cylindrical body 16 of the housing 14, which causes the piston 38 to move relative to the operating member 56, which compresses the biasing spring 88.

FIG. 2 is a cross-sectional view of the pressure regulator 12, taken along section line 2—2 of FIG. 1. The rod-like body 76 of the stem 74 has a central bore which defines the flow passage 78. A tube extends through the flow passage 78 to define the vent passage 80, and preferably is centrally disposed coaxially within the bore which defines the flow passage 78 through the body 76. In other embodiments, two separate bores may be provided which extend separately through the stem 74 to provide a flow passage and a vent passage, rather than the flow passage 78 and the vent passage 80.

FIG. 3 is a longitudinal section view of the pressure regulator 12, showing the operating member 56 at a second, selected position between the open end 20 and the closed end 22 of the cylindrical body 16. Positioning of the operating member 56 locates the flow ports 60 within the interior cavity 42 of the piston 38 and relative to the chamber 18 of the cylindrical body 16. Then, the seal 72 will operate in conjunction with the piston 38 and the biasing spring 88 to selectively position the flow ports 54, which extend radially through the sides of the piston 38, relative to the seal 72 and the flow ports 60 of the operating member 56. As the pressure in the closed end 22 of the cylinder chamber 18 and the pressure output port 24 increases, the piston 38 will be pushed toward the open end 20 of the chamber 18, compressing the spring 88 between the piston 38 and the end cap 26. This will move the flow port 54 of the piston 38 until the seal 72 extends between the flow ports 54 of the piston 38 and the annular region 61, which is adjacent to the flow ports 60 of the operating member 56. The seal 72 will then seal between the flow ports 54 of the piston 38 and the flow ports 60 of the operating member 56 until the pressure in the closed end 22 of the chamber 18 falls beneath the set point pressure.

FIG. 4 is a longitudinal section view of the pressure regulator 12, shown after the pressure of the portion of the chamber 18 which is adjacent to the discharge port 24 has increased to the set point pressure, compressing the spring biasing means 88 and pushing the piston 38 closer to the open end 20 of the chamber 18. The seal 72 is disposed directly between the flow ports 54 of the piston 38 and the annular region 61 which is adjacent to the flow ports 60 of the operating member 56. This seals the flow path extending between the port 60 of the operating member 56 and the flow port 54 of the piston 38. When the pressure within the closed end portion 22 of the chamber 18 and the output port 24 is reduced from the set point, the biasing spring 88 will push the piston 38 toward the closed end 22 until the flow port 54 of the piston 38 is disposed between the seals 72 and the flow port 60 of the operating member 56, such that the operating fluid may passed therebetween.

FIG. 5 is a longitudinal section view of the pressure regulator 12, shown after the operating member 56 has been moved closer to the open end 20 of the chamber 18, which will result in a higher pressure set point than that for the positioning of the operating member 56 shown in FIGS. 3 and 4. The operating fluids at supply pressure will pass through the stem 74 and the operating member 56, through the flow ports 60, around the annular region 61 and into the flow ports 54 of the piston 38. The operating fluid will then pass through the flow port 54, into the annular space between the interior surface 23 of the chamber 18 and the reduced diameter region 44 of the piston 38, to the closed end 22 of the chamber 18 and through the pressure output port 24. As the pressure of the operating fluid within the output portion of the chamber 18 increases, the piston 38 will be pushed toward the open end 20 of the chamber 18 and toward the end cap 26 with increasing force, compressing the bias spring 88 until the flow port 54 is moved over the seal 72 at the set point pressure of the regulator 12. In this preferred embodiment, the seal 72 moves across a cylindrical surface, defined by the polished bore 62, for positioning on opposite sides of the flow port 54.

The pressure in portion of the interior cavity 42 of the piston 38, which is adjacent to the closed end 43, is preferably vented to substantially atmospheric pressure by the vent passage 64, the vent passage 80 and the vent port 86, such that there will not be any substantial pressure acting on the operating member 56 and the stem 74 in a longitudinal direction relative to the cylindrical body 16 of the housing 14. In other embodiments, the closed end portion of the cavity 42 may instead by vented by a bore 92 (shown in phantom) which extends from an inlet 94 to an outlet 96 to provide communication between the closed end portion of the cavity 42 and the open end 20 of the chamber 18. The portion of the chamber 18 which is adjacent to the end cap 26 is vented to the exterior of the housing 14 by the vent hole 34. If the vent hole 34 connects to the atmosphere, then both ends of the operating member 56 are exposed to atmospheric pressure, such that there is substantially no pressure acting to move the stem 74 in a longitudinal direction relative to the chamber 18, or to resist movement of the stem 74 to select the pressure output of the pressure regulator 12. The stem 74 may thus be moved into and out of the cylindrical body 16 of the housing 14 without having to overcome the output pressure of the regulator 12, or the force of the biasing spring 88.

FIG. 6 is a longitudinal section view of an alternative valve operating member 100 which may optionally be used in the pressure regulator 12 in place of the valve operating member 56. The valve operating member 100 is similar to the operating member 56, with various component portions of the valve operating member 100 and the operating member 56 being the same, except that the seal gland 70 and the seal 72 of the operating member 56 have been replaced in the valve operating member 100 with two spaced apart seal glands 102 and 104 and seal elements 106 and 108. The seal elements 106 and 108 fit within the seal glands 102 and 104, respectively. Spacing apart the seal glands 102 and 104 by a selected distance in a longitudinal direction relative to the valve operating member 100 and the pressure regulator 12 operates in conjunction with the bias spring 88 to determine whether the pressure regulator 12 is self-relieving, and whether there is a pressure range which provides a dead-band, or hysteresis, in which the pressure regulator 12 will not be self-relieving.

As shown in FIGS. 1–5, when a pressure at the pressure output port 24 exceeds the set point pressure of the pressure regulator 12, which may be caused by other operating fluid components which are connected to the output 24 of the regulator 12, then, the pressure regulator 12 is self-relieving, such that the excess pressure in the output portion of chamber 18 will be released by pushing the piston 38 toward the open end 20 of the housing 14, until the port 54 is located between the seal 72 and the open end 20. The output pressure within the chamber 18 which is adjacent to the closed end 22 of the housing 14 will then be bled through the vent port 34, until the output pressure adjacent to the closed end 22 drops to the output pressure set point of the regulator 12. Then, the bias spring 88 will move the piston 38 to align the flow port 54 with the seals 72, sealing the output pressure within the output portion of the chamber 18 from venting through the vent port 34 and to the exterior of the housing 14. Additionally, if the operating member 56 is moved inward toward the closed end 22 of the housing 14, the port 54 would then being disposed on the opposite side of the seal 72 from the flow ports 60 and the pressure in the chamber 18 adjacent to the closed end 22 of the housing 14 would be vented through the open end 41 of the piston 31 and the vent hole 34 to the exterior of the housing 14.

In the embodiment shown in FIG. 6, the spacing between the two spaced apart seal glands 102 and 104 will determine the pressure differential, in relation to the output set point pressure of the regulator 12, at which the pressure within the output portion of the chamber 18 will be vented through the vent port 34 and to the exterior of the housing 14. The pressure differential between the output set point pressure and the self-relieving pressure is determined by the combination of the spacing between the seal glands 102 and 104, the spring constant for the spring 88 in the relative range over which the spring 88 is compressed, and the positioning of the seal glands 102 and 104 relative to the longitudinal length housing 14 and the spring seat 30 of the end cap 26. The seal glands 102 and 104 may also be spaced apart in relation to the longitudinal ends of the housing 14 and the spring constant for the biasing spring 88, such that the pressure regulator 12 will not be self-relieving at any pressure. Instead, the piston 38 may bottom out by fully compressing the spring 88 against the spring seat 30 of the end cap 26 prior to venting the output portion of chamber 18 to the vent hole 34.

The present invention provides several advantages over the prior art. A pressure regulator is provided in which the regulated output pressure is selected by selectively positioning an operating member at selected distances between the ends of the housing of the pressure regulator, without having to overcome forces exerted by the output pressure or a biasing spring. The operating member has a supply fluid port which is positioned within the interior cavity of a piston by selectively positioning the operating member within a chamber of the pressure regulator housing. The piston moves within the chamber of the housing to align a port through the piston, which is fluid communication with the pressure output of the housing of the pressure regulator, relative to a fluid seal and a supply pressure port. A biasing spring acts on the piston in an opposite direction to that which the pressure output of the pressure regulator applies pressure to the piston. The distance between the spring seats within which the biasing spring is mounted is selectively changed by the piston seeking an equilibrium position in response to the positioning of the flow port of the operating member. The opposite ends of the operating member are vented to one another, and preferably to atmosphere, such that the operating force required to move the body of the operating member is not required to overcome the force of the biasing spring or a force applied by output pressure. Thus, low forces are required for moving the operating member to select the output pressure of the pressure regulator.

Although the preferred embodiment has been described in detail, it should be understood that various changes, substitutions and alterations can be made therein without departing from the spirit and scope of the invention as defined by the appended claims.

What is claimed is:

1. An apparatus for regulating an output pressure of an operating fluid, comprising:

a housing having a chamber and a pressure output port in fluid communication with an output portion of said chamber;

a piston having an interior cavity and a first flow port which is in fluid communication with said interior cavity and an exterior of said piston, said piston having at least a portion thereof disposed within said chamber in moveable relation with said housing with said first flow port of said piston being disposed in fluid communication with said chamber;

a first seal which extends between said piston and said chamber of said housing, on an opposite side of said first flow port through said piston from said output portion of said chamber;

a biasing member extending between said piston and said housing such that a biasing force is exerted against said piston which increases as said piston is moved in a first direction and decreases as said piston is moved in a second direction;

an operating member disposed within said interior cavity of said piston, said operating member having a second flow port which is disposed at a selected distance from a first end of said housing and which is in fluid communication with a supply operating fluid pressure;

a second seal which is disposed between said operating member and said interior cavity of said piston, said second seal being moveable relative to one of said first and second flow ports to prevent flow of the operating fluid from said second flow port to said first flow port;

a third seal which is disposed between said operating member and said interior cavity of said piston, for sealing said interior cavity of said piston on an opposite side of at least one of said first and second flow ports from said second seal;

wherein said piston moves within said chamber of said housing to position said second seal relative to said first and second flow ports to pass the operating fluid between said first and second flow ports in response to said output pressure falling beneath a selected value, and said piston moves within said chamber of said housing to position said second seal relative to said first and second flow ports such that the flow of the operating fluid between said first and second flow ports is restricted in response to said output pressure exceeding said selected value; and a vent passage extending from said interior cavity of said piston, through one of said operating member and said piston, and across oppositely disposed sides of said second and third seals to vent said interior cavity of said piston across at least a portion of said operating member about which said second and third seals are disposed to equalize pressure therebetween.

2. The apparatus according to claim 1, wherein said biasing member comprises a coiled compression spring.

3. The apparatus according to claim 1, wherein a rod is attached to said operating member, and said rod includes a flow passage which longitudinally extends within said rod, said flow passage having an end which is in fluid communication with said second flow port of said operating member and an opposite end which is in fluid communication with the supply operating fluid pressure.

4. The apparatus according to claim 1, wherein said selected distance is a substantially fixed setting to provide a substantially fixed output pressure setting of said pressure output port.

5. The apparatus according to claim 1, wherein said selected distance is selectably adjustable for selecting an output pressure setting of said pressure regulator.

6. The apparatus according to claim 1, wherein said second seal comprises and elastomeric member which is disposed between said operating member and said piston to sealingly engage therebetween.

7. The apparatus according to claim 1, further comprising a seal gland which extends into an exterior periphery of said operating member for receiving said second seal member.

8. The apparatus according to claim 1, wherein said second seal is defined by an elastomeric seal member which is disposed between said piston and said operating member to sealingly engage therebetween.

9. The apparatus according to claim 8, further comprising a seal gland which extends into an exterior periphery of said operating member for receiving said seal member.

10. An apparatus for regulating an output pressure of an operating fluid, comprising:

a housing defined by a cylinder body having a cylindrical chamber defined therein, and a pressure output port defined to extend from an output portion of said chamber;

a piston having a cylindrical piston body which is coaxially disposed with said cylinder body of said housing, said piston body having an interior cavity defined within said piston body and a first flow port which extends from said interior cavity to an exterior portion of said piston body, and said piston having a closed end and an open end, and at least a portion thereof disposed within said chamber in moveable relation with said housing, and said first flow port of said piston being in fluid communication with said chamber of said housing and said interior cavity of said piston;

a first seal extending between said piston and said chamber of said housing, on an opposite side of said first flow port of said piston from said output portion of said chamber;

a biasing member extending between said piston and said housing such that a biasing force is exerted against said piston which decreases as said piston is moved inward toward said output portion of said chamber, and which increases as said piston is moved outward from within said output portion of said chamber;

an operating member extending within said interior cavity of said piston, said operating member having a second flow port which is disposed at a selected distance from a first end of said housing and which is in fluid communication with a supply operating fluid pressure;

a second seal which is defined to extend between said operating member and said interior cavity of said piston on an opposite side of at least one of said first and second flow ports from said closed end of said interior cavity of said piston, and said second seal being moveable relative to one of said first and second flow ports to prevent flow of said operating fluid from said second flow port to said first flow port;

a third seal which is defined to extend between said operating member and said interior cavity of said piston, spaced apart from said second seal for sealing between said interior cavity of said piston and said operating member on an opposite side of said first and second flow ports from said open end of said interior cavity; and wherein said piston moves within said chamber of said housing to position said second seal relative to said first and second flow ports to pass said operating fluid between said first and second flow ports in response to said output pressure falling beneath a selected value, and said piston moves within said chamber of said housing to position said second seal relative to said first and second flow ports such that said flow of the operating fluid between said first and second flow ports is prevented in response to said output pressure exceeding said selected value.

11. The apparatus according to claim 10, wherein said biasing member comprises a coiled compression spring.

12. The apparatus according to claim 10, wherein a rod is attached to said operating member, and said rod includes a flow passage which longitudinally extends within said rod, and said flow passage having an end which is in fluid communication with said second flow port of said operating member and an opposite end which is in fluid communication with the supply operating fluid pressure.

13. The apparatus according to claim 10, wherein said seal is defined by an elastomeric seal member which is disposed between said operating member and said piston to sealingly engage therebetween.

14. The apparatus according to claim 13 further comprising a seal gland which extends into an exterior periphery of said operating member for receiving said seal member.

15. The apparatus according to claim 10, wherein said second seal is defined by an elastomeric seal member which is disposed between said piston and said operating member to sealingly engage therebetween.

16. The apparatus according to claim 15, further comprising a seal gland which extends into an exterior periphery of said operating member for receiving said elastomeric seal member which defines said third seal.

17. A method for regulating an output pressure of an operating fluid, comprising the steps of:

providing a housing having a chamber defined therein, one end of the chamber defining a pressure output portion within which a piston is disposed in moveable relation therewith, the piston having an interior cavity and a first flow port in fluid communication with both the interior cavity and the pressure output portion of the chamber, and further providing an operating member which extends within the interior cavity of the piston, the operating member having a second flow port which is in fluid communication with the interior cavity of the piston;

providing a first seal between the housing and the piston, on an opposite side of the first flow port from the output portion of the chamber;

biasing the piston to move into the pressure output portion of the chamber, wherein a biasing force is exerted against the piston which increases as the piston is moved in a first direction outward from the output pressure port of the chamber and decreases as the piston is moved in a second direction further into the pressure output portion of the chamber;

positioning the operating member within the interior cavity of the piston, such that the second flow port of the operating member is disposed at a selected distance from a first end of the housing, providing a second seal between the operating member and the interior cavity of the piston, such that one of the operating member and the piston is moveable relative to the second seal to prevent flow of the operating fluid from the second flow port to the first flow port;

providing a third seal disposed between the operating member and the interior cavity of the piston, sealingly engaging between the interior cavity and the operating member on an opposite side of at least one of the first and second flow ports from the first seal and from an open end of the interior cavity;

connecting the second flow port in fluid communication with a supply operating fluid pressure; and wherein the piston moves within the chamber of the housing to position the second seal relative to the first and second flow ports to pass the operating fluid between the first and second flow ports in response to the output pressure falling beneath a selected value, and the piston moves within the chamber of the housing to position the second seal relative to the first and second flow ports such that the flow of the operating fluid between the first and second flow ports is restricted in response to the output pressure exceeding the selected value.

18. The method according to claim 17, wherein the step of positioning the operating member comprises the step of slidably moving the operating member relative to the piston and the chamber of the housing, free of the biasing member applying the biasing force to the operating member.

19. The apparatus according to claim 10, further comprising a vent passage extending through one of said operating member and said piston, for venting a portion said interior cavity of said piston from said closed end of said interior cavity to said open end of said interior cavity to equalize pressure on opposite sides of said second and third seals.

20. The method according to claim 10, further comprising the step of venting the interior chamber of the piston from the closed end of the interior chamber to the open end of the interior chamber.

* * * * *